120,579

UNITED STATES PATENT OFFICE.

WILLIAM ALBERT FISCHER, OF ALLEGHENY CITY, PENNSYLVANIA.

IMPROVEMENT IN COMPOSITIONS FOR MAKING CRUCIBLES, GLASS-MELTING POTS, &c.

Specification forming part of Letters Patent No. 120,579, dated November 7, 1871.

*To all whom it may concern:*

Be it known that I, WILLIAM ALBERT FISCHER, a subject of the Emperor of Prussia, now residing in the city of Allegheny, Pennsylvania, have invented certain Improvements in Glass-Pots, Crucibles, and Lining for Furnaces, of which the following is a specification, reference being had to the accompanying drawing and letters of reference marked thereon which make a part of this specification.

My invention consists in constructing glass-pots, crucibles, and lining furnaces with a compound composed of fire-clay (raw and burned) and calcined magnesia, prepared and mixed together in about the proportions hereinafter described.

I take two parts of raw fire-clay, one part of burned fire-clay or old glass-pots or crucibles, and reduce these ingredients to a fine powder and mix them thoroughly together so as to form one mass, and then mix with this mass about eight per cent. of calcined magnesia (known as burned magnesia) finely pulverized, so mixing the fire-clays and magnesia together as to form a homogeneous mass of mixed particles. I then take of the fire-clay of the same proportions—two parts of raw and one part burned—and mixed as before described, fifteen parts, and of calcined magnesia eighty-five parts, and mix these ingredients together. This last-described mixture is used for forming the lining of the crucible, furnace, or glass-pot. The two compounds hereinbefore described are made plastic by the addition of water.

The glass-pot is constructed in the usual manner and of any known form by using the first-described mixture; and as the pot is being built its inner walls are lined with the second-described mixture, making the lining about a half inch in thickness. Crucibles are constructed substantially in the same manner. Furnaces are lined with the last-described compound. Glass-pots constructed as described, or lined with the last-described compound, will be very durable, and will not be subject to the cutting and wasting of the alkalies used in process of glass-making; and crucibles and furnaces lined with the compound will be durable.

I wish it clearly understood that I do not claim, broadly, the use of magnesia combined with other ingredients for constructing glass-melting pots.

What I claim as of my invention is—

The compounds herein described for the making and manufacturing of crucibles, glass-melting pots, &c.

WM. A. FISCHER.

Witnesses:
A. C. JOHNSTON,
JAMES J. JOHNSTON.           (115)